(12) United States Patent
Jeon et al.

(10) Patent No.: US 12,384,393 B2
(45) Date of Patent: Aug. 12, 2025

(54) OPERATION APPARATUS FOR VEHICLE

(71) Applicant: SEOYON E-HWA CO., LTD., Anyang (KR)

(72) Inventors: Jong Hwan Jeon, Anyang (KR); Ho Jae Lee, Cheonan (KR)

(73) Assignee: SEOTON E-HWA CO., LTD., Anyang (KR)

( * ) Notice: Subject to any disclaimer, the term of this patent is extended or adjusted under 35 U.S.C. 154(b) by 489 days.

(21) Appl. No.: 17/932,671

(22) Filed: Sep. 16, 2022

(65) Prior Publication Data

US 2023/0138682 A1    May 4, 2023

(30) Foreign Application Priority Data

Oct. 30, 2021  (KR) .................. 10-2021-0147500

(51) Int. Cl.
| | |
|---|---|
| *B60W 50/10* | (2012.01) |
| *B60K 35/10* | (2024.01) |
| *B60K 35/50* | (2024.01) |
| *B60K 35/60* | (2024.01) |
| *B60W 40/09* | (2012.01) |
| *B60W 50/08* | (2020.01) |

(52) U.S. Cl.
CPC .............. *B60W 50/10* (2013.01); *B60K 35/50* (2024.01); *B60K 35/60* (2024.01); *B60W 40/09* (2013.01); *B60W 50/085* (2013.01); *B60K 35/10* (2024.01); *B60W 2540/215* (2020.02); *B60W 2540/30* (2013.01)

(58) Field of Classification Search
CPC ..... B60W 50/08; B60W 50/085; B60W 50/10
See application file for complete search history.

(56) References Cited

U.S. PATENT DOCUMENTS

| | | | |
|---|---|---|---|
| 2014/0001834 A1* | 1/2014 | Rudolph | ............. B60R 25/2063 307/9.1 |
| 2015/0088336 A1 | 3/2015 | Shin | |
| 2023/0094520 A1* | 3/2023 | Kim | ...................... B60K 35/22 701/36 |

FOREIGN PATENT DOCUMENTS

| | | |
|---|---|---|
| JP | 2019-127139 A | 8/2019 |
| KR | 10-2015-0034018 A | 4/2015 |
| KR | 10-2019-0036714 A | 4/2019 |
| KR | 10-2277316 B1 | 7/2021 |

* cited by examiner

*Primary Examiner* — Imran K Mustafa
(74) *Attorney, Agent, or Firm* — Harvest IP Law, LLP

(57) ABSTRACT

Proposed is an operation apparatus for a vehicle. The operation apparatus is configured to reduce the number of buttons required to operate a device of the vehicle, thereby preventing an interior of the vehicle from being cluttered with many buttons. The buttons in the proposed apparatus can be located in different positions according to a user's action for manipulating the buttons, and are manipulated to perform different functions depending on the position of an operation module included in the operation apparatus.

9 Claims, 8 Drawing Sheets

OPERATION APPARATUS FOR VEHICLE

CROSS REFERENCE TO RELATED APPLICATION

The present application claims priority to Korean Patent Application No. 10-2021-0147500, filed Oct. 30, 2021, the entire contents of which is incorporated herein for all purposes by this reference.

BACKGROUND OF THE INVENTION

The present disclosure relates to an operation apparatus having a button used by a user to operate devices included in a vehicle, primarily from the inside of the vehicle.

In general, vehicles are equipped with an array of devices related to driving to enhance comfort and convenience of a user (driver and/or passenger). These devices are controlled by buttons (or switches) that the user directly manipulates.

The buttons may be provided in various forms in an interior of the vehicle. In recent years, as the vehicles come equipped with more functions, the number of buttons disposed in the interior of the vehicle is gradually increasing. This may create a poor impression that it is difficult and complicated for the user to manipulate numerous buttons, or may lead to errors in the operation of the buttons. In addition, cluttered interior with too many buttons may degrade the aesthetic quality of the interior of the vehicle.

SUMMARY OF THE INVENTION

Accordingly, the present disclosure has been made keeping in mind the above described problems, and is intended to provide an operation apparatus for a vehicle that improves the visibility of a button and the aesthetic value of a vehicle by configuring the button to appear and disappear.

Another objective of the present disclosure is to provide an operation apparatus for a vehicle that enables reduction of the number of buttons and simplification of the structure.

The objectives of the present disclosure are not limited to those mentioned above, and other objectives not mentioned will be clearly understood by those skilled in the art from the following description.

In order to achieve the above objective, according to an embodiment of the present disclosure, there is provided an operation apparatus for a vehicle, the operation apparatus including: a panel provided in the vehicle, and having an opening; an operation module capable of moving, through the opening, forward and backward between a first position and a second position spaced apart from each other and having a button disposed at a front end thereof; a drive unit for moving the operation module; a sensor that detects a user's action for manipulating the button; and a control unit that controls the drive unit on the basis of a detection signal from the sensor.

The operation apparatus for a vehicle according to the embodiment of the present disclosure may be operated such that the operation module is moved from the first position a first distance or a second distance according to the user's action to be located in a front region or a rear region of the second position, and the button is actuated to perform first and second functions depending on whether the operation module is located in the front region or in the rear region.

The operation module may be controlled by the control unit. In the operation apparatus for a vehicle according to the embodiment of the present disclosure, the operation module may be switched to an active state by the control unit in the second position and an inactive state in the first position.

The operation module may include a light source. In the operation apparatus for a vehicle according to the embodiment of the present disclosure, the light source may emit light of different colors depending on whether the operation module is located in the front region or in the rear region.

The light source may be built into the button. The button may have a light-transmitting area for transmitting light from the light source on a surface thereof.

The operation module may be configured such that, in the first position, a surface of the button is flush with a surface of the panel. The second position is located forward of the first position, and the operation module may be configured such that, in the second position, the button protrudes from the surface of the panel. Alternatively, the second position is located rearward of the first position, and the operation module may be configured such that, in the second position, the button is recessed from the surface of the panel.

The sensor may be configured to detect whether a user's body is located in a first range or a second range, which are different ranges, with respect to the button on the basis of the user's action.

In the operation apparatus for a vehicle according to the embodiment of the present disclosure, the operation module may be moved the first distance when the sensor detects that the user's body is located in the first range. In addition, the operation module may be moved the second distance when the sensor detects that the user's body is located in the second range.

The operation apparatus for a vehicle according to the embodiment of the present disclosure may further include: a finish skin that provides a finished surface covering a surface of the panel to block the opening, has flexibility and light transmittance, and is configured such that a portion blocking the opening is moved together with the button so that a shape of the finished surface is changed according to a movement of the operation module.

Meanwhile, contrary to the description above, the operation apparatus for a vehicle according to the embodiment of the present disclosure may be operated such that the operation module is moved between the first position and the second position without distinction between the front region and the rear region, and when the sensor detects that the user's body is located in the first range, the operation module in the inactive state located in the first position is switched to the active state and the light source in the off state emits light of the first color, whereas when the sensor detects that the user's body is located in the second range, the operation module in the inactive state located in the first position is moved to the second position by the drive unit and switched to the active state, and the light source in the off state emits light of the second color, and when the operation module is active in the first position and when the operation module is located in the second position, the button performs the first function and the second function, respectively. At this time, the operation module in the active state in the first position and in which the light source is turned on may be switched to the inactive state and the light source may be turned off if there is no manipulation of the button for a preset time. The operation module located in the second position may be moved to the first position and switched to the inactive state, and the light source may be turned off if there is no manipulation of the button for the preset time.

Alternatively, contrary to the description above, the operation apparatus for a vehicle according to the embodiment of the present disclosure may be operated such that the operation module is moved between the second position, which is located forward of the first position, and a third position, which is located rearward of the first position, via the first position without distinction between the front region and the rear region, and when the sensor detects that the user's body is located in the first range, the operation module is moved from the first position to the second position and is switched to the active state, the button protrudes from the surface of the panel, and the light source emits light of the first color, whereas when the sensor detects that the user's body is located in the second range, the operation module is moved from the first position to the third position and switched to the active state, the button is recessed from the surface of the panel, and the light source emits light of the second color. In addition, when the operation module is located in the second position and when the operation module is located in the third position, the button may perform the first function and the second function, respectively. At this time, the operation module, when located in the second position and in the third position, may be moved to the first position and switched to the inactive state and the light source may be turned off if there is no manipulation of the button for a preset time.

According to an embodiment of the present disclosure, depending on the position of an operation module, a button may be in a state that is easy to be seen by a user (for example, a state in which the operation module is located in a second position and the button protrudes from the surface of a panel) or in a state that is difficult to be seen by the user (for example, a state in which the operation module is located in a first position and the surface of the button is flush with the surface of the panel). Accordingly, regarding the button, it is possible to provide better visibility and improved design.

Furthermore, according to an embodiment of the present disclosure, since different functions are performed depending on the position of the button, it is possible to reduce the number of buttons to be applied to the vehicle, thereby preventing the interior of a vehicle from being cluttered with many buttons.

Technical solutions will become more specific and clear from the examples, drawings, etc. described below. In addition, various solutions other than the aforementioned ones may be additionally suggested below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, embodiments of the present disclosure will be described with reference to the accompanying drawings.

The terminology used herein is for the purpose of describing particular embodiments only and is not intended to be limiting the present disclosure. As used herein, the singular forms are intended to include the plural forms as well, unless the context clearly indicates otherwise. It will be further understood that the terms "comprises", "includes", or the like when used herein, specify the presence of stated features, steps, operations, elements, components, or combinations thereof, but do not preclude the presence or addition of one or more other features, steps, operations, elements, components, or combinations thereof.

According to an embodiment of the present disclosure, an operation apparatus for a vehicle, a vehicle including the same, etc. may be provided. The operation apparatus may be used to operate various devices included in a vehicle. For example, devices operated by the operation apparatus (hereinafter referred to as a device to be operated) may include a navigation device, an air conditioning device, a sound device, a lighting device, a door lock device, a door opening or closing device, a motor/engine starting device, a driving speed control device, etc. Therefore, the vehicle according to the embodiment of the present disclosure may include the operation apparatus and at least one or more devices to be operated by the operation apparatus. The operation apparatus and the device to be operated may be electrically connected to each other.

The operation apparatus is installed in a vehicle and includes a button manipulated by a user. The operation apparatus may be provided to constitute a part of a vehicle. The part to which the operation apparatus is applied may be primarily an interior part of a vehicle. For example, the interior part may be a door trim, a ceiling panel, a dashboard, a console, a seat, an armrest, and the central part of a steering wheel (hub), etc. Embodiments of the present disclosure will be mainly focused on application of the operation apparatus to an interior part of a vehicle.

The structure and operation of the operation apparatus are exemplified in FIGS. 1 to 5.

Figure 1:
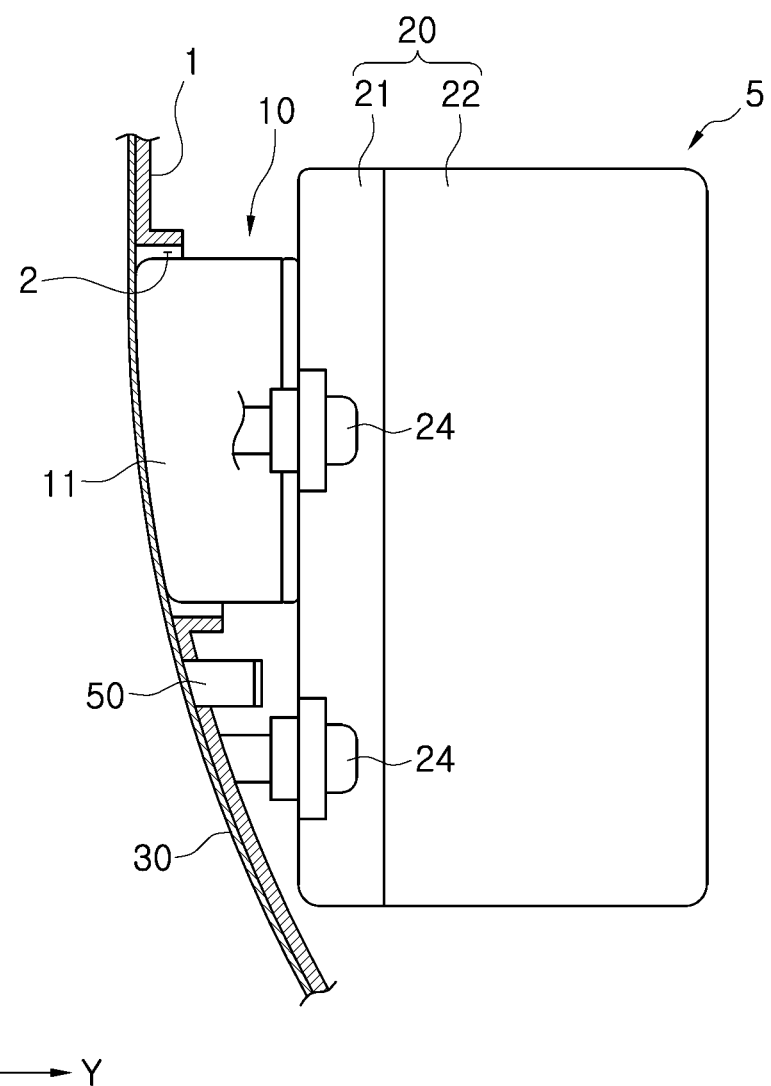
FIGS. 1 and 2 are respectively a side view and a block diagram illustrating an operation apparatus for a vehicle according to an embodiment of the present disclosure.

As illustrated in FIG. 1, the operation apparatus includes: a panel 1 constituting an interior part of a vehicle; and at least one operation module assembly 5 provided on the panel 1.

The panel 1 has a panel surface and a panel back surface. The panel 1 may be configured such that the panel surface provides only a part of a surface of an interior part depending on the type, shape, etc. of the interior part, or that the panel surface provides the entire surface of the interior part. The panel 1 has an opening 2. The opening 2 is provided to penetrate the panel 1 into the panel surface and the panel back surface.

The operation module assembly 5 includes an operation module 10. The operation module 10 includes a button 11 manipulated by a user and is configured to be operated, for example, in a touch manner. The button 11 is disposed at a front end of the operation module 10, and thus the operation module 10 has a front part including the front end composed of the button 11. The operation module 10 is moved in a front-back direction (refer to the Y-axis direction) with respect to the opening 2 of the panel 1. The front-back direction is defined as directions that consist of a front direction F (shown in FIGS. 4 to 8) facing toward inside of the vehicle from the panel surface and a back direction facing toward the opposite direction of the front direction. Hereinafter, the front-back direction is also referred as a Y-axis direction. The button 11 that moves together with the operation module 10 may appear and disappear through the opening 2. In order to make the button 11 appear and disappear, the button 11 may protrude from the panel surface to create an embossed look and feel that clearly reveals its position and/or shape (see FIGS. 4 and 5). The button 11 may be recessed from the panel surface to create an engraved form that also clearly reveals its position and/or shape. The protrusion and recession may be achieved by moving the operation module 10 along the Y-axis direction with respect to the opening 2 of the panel 1. The number of openings 2 may be increased or decreased according to the number of operation module assemblies 5 provided.

The operation apparatus further includes a skin 30 covering the surface of the panel and the button 11 to provide a finished surface. The skin 30 may be sized to cover some or all of the panel surface including the opening 2 of the panel 1. The skin 30 is flexible so that when the button 11 is moved, the portion covering the button 11 (e.g. the portion blocking the opening 2) is deformed by the button 11 and the shape of the finished surface may be changed. For example, a portion covering the button 11 may be protruded by the button 11 in a generally flat shape of the finished surface (refer to FIGS. 4 and 5). When the finished surface is restored to the generally flat shape, the shape of the button 11 is hidden, and thus it is possible to prevent the interior of the vehicle from being cluttered with the button 11 (see FIG. 1).

The skin 30 may be bonded to the panel surface. In addition, the skin 30 may be precisely deformed and moved together with the button 11 when the portion covering the button 11 (e.g. the portion that blocks the opening 2) is bonded to the surface of the button 11. In particular, bonding of the skin 30 to the surface of the button 11 may be desired when the button 11 is retractable against the panel surface. The bonding of the skin 30 to the panel surface and/or the bonding of the skin 30 to the surface of the button 11 may be made firmly by an adhesive or the like.

Figure 4:
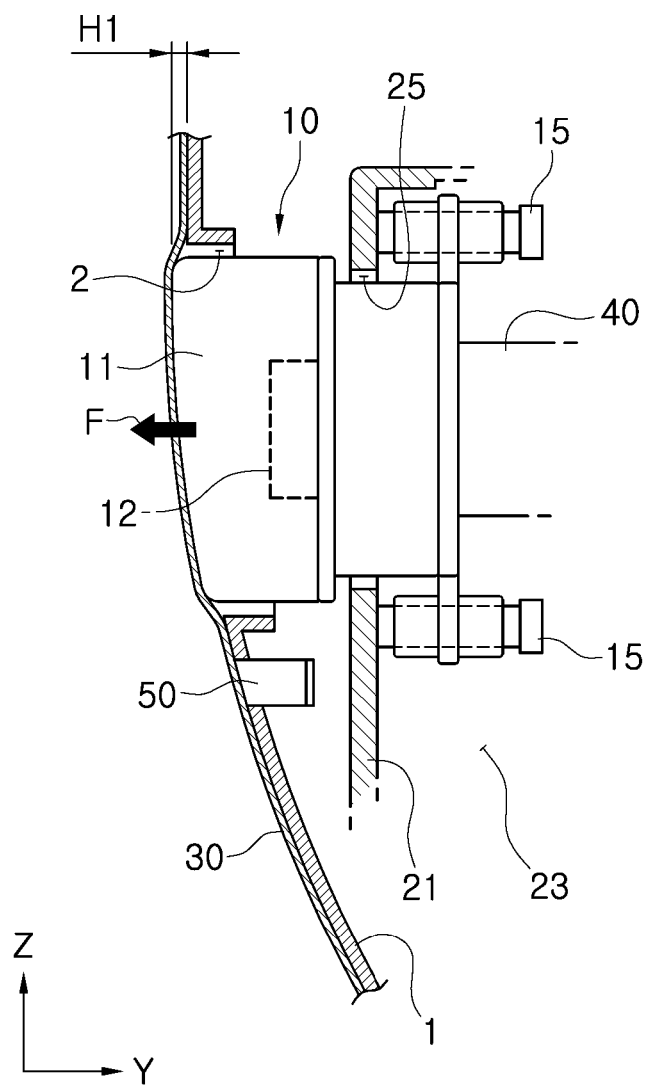
FIGS. 4 and 5 are side views illustrating an operation of the operation apparatus for a vehicle according to the embodiment of the present disclosure.
Figure 5:
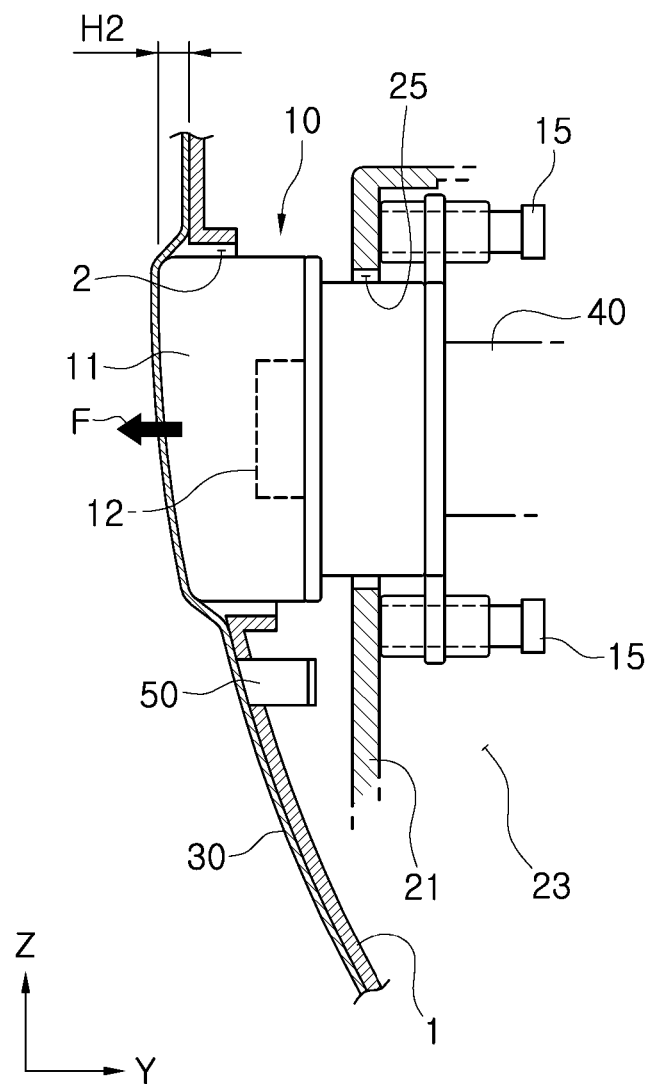

As illustrated in FIGS. 1, 4, and 5, the operation module assembly 5 further includes a base 21 disposed at a rear of the panel 1, and a base cover 22 detachably coupled to the base 21 at a rear of the base 21. The base 21 and the base cover 22 constitute the case 20. The base 21 and the base cover 22 coupled to each other are configured to provide an accommodating space 23 therebetween which is partially or wholly blocked from the outside. The base 21 may be mounted on the back side of the panel by means of fastening elements 24 such as bolts. The base 21 has a through region 25 facing the opening 2 of the panel 1. For example, the through region 25 may be provided in the form of a hole.

The operation module 10 is, in a state of being inserted into the through region 25 of the base 21, provided to be movable between a first position and a second position spaced apart from each other along the Y-axis direction through the opening 2 of the panel 1. The first position is a position where the button 11 is accommodated in the opening 2, and the button 11 is formed such that the surface thereof is flush with the panel surface when the operation module 10 is located in the first position. The second position is located forward of the first position in the front direction F and is a position where the button 11 protrudes from the panel surface. When the operation module 10 is located in the first position, the skin 30 may hide the button 11 by providing a finished surface in a generally flat shape (see FIG. 1). When the operation module 10 is moved to the second position so that the button 11 protrudes from the panel surface, the skin 30 may be deformed into a shape in which a portion covering the button 11 protrudes by the button 11 to reveal the position of the button 11 (see FIGS. 4 and 5). Depending on implementation conditions, etc., the second position may be a position in which the button 11 is recessed with respect to the panel surface while located rearward of the first position in the back direction. In this case, when the operation module 10 is moved to the second position, the skin 30 may be deformed into a shape in which the portion covering the button 11 is recessed to reveal the position of the button 11.

As illustrated in FIGS. 4 and 5, the operation module 10 may be moved along the Y-axis direction by a Y-axis guide 15. The Y-axis guide 15 may include guide pins provided on the base 21. The guide pins may be attached to the base 21 around the through region 25. The operation module 10 may have guide holes into which the guide pins are inserted so that the operation module 10 can be moved according to the guidance of the guide pins along the Y-axis direction.

Figure 6:
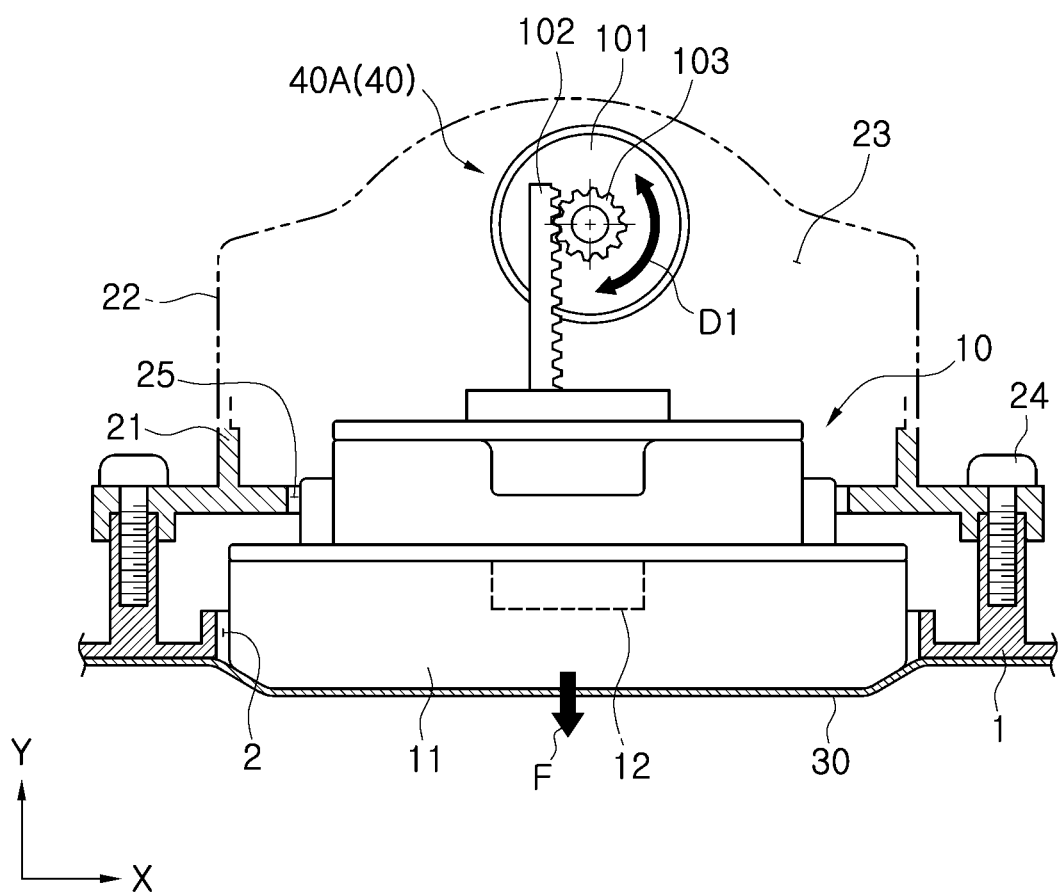
FIG. 6 is a plan view illustrating an example of the operation apparatus for a vehicle and a drive unit applied thereto according to the embodiment of the present disclosure.
Figure 7:
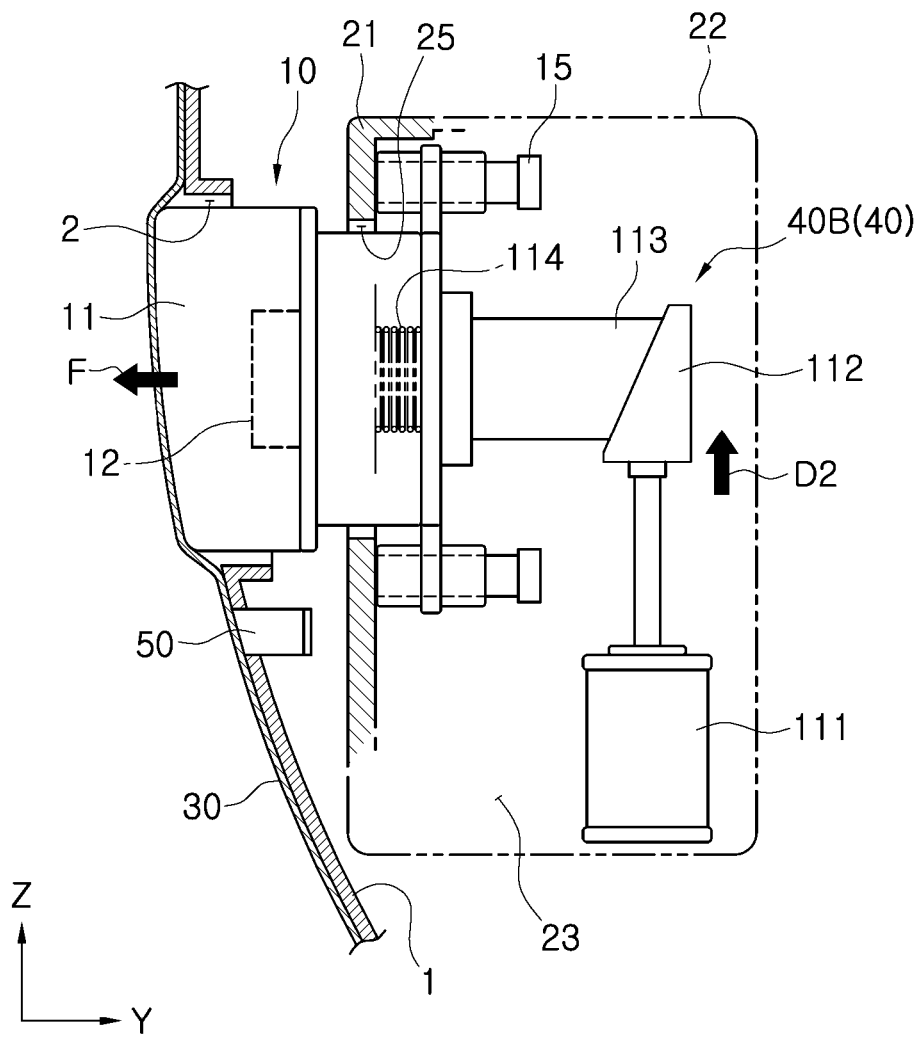
FIG. 7 is a side view illustrating another example of the operation apparatus for a vehicle and the drive unit applied thereto according to the embodiment of the present disclosure.
Figure 8:
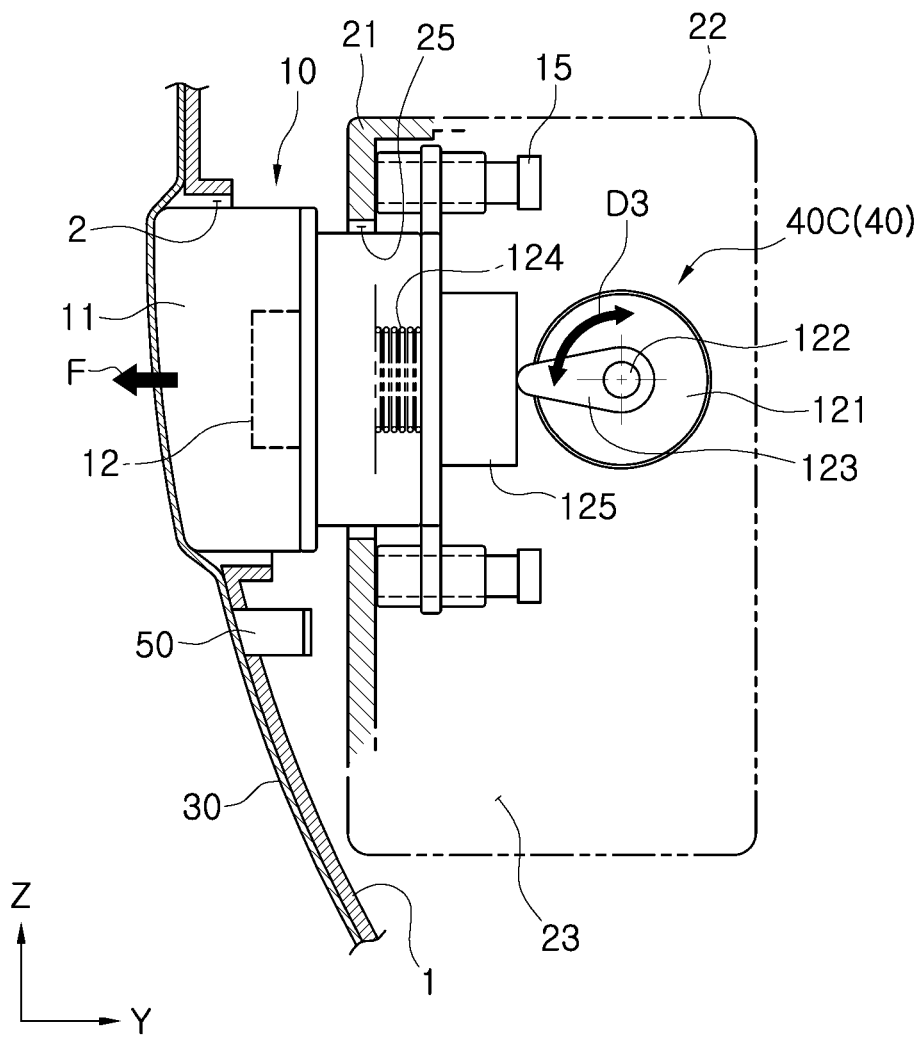
FIG. 8 is a side view illustrating still another example of the operation apparatus for a vehicle and the drive unit applied thereto according to the embodiment of the present disclosure.

The operation module assembly 5 further includes a drive unit 40 for moving the operation module 10 along the Y-axis direction to locate the operation module 10 in the first position or the second position. For reference, an outline of the drive unit 40 is shown in FIGS. 4 and 5, and details of the drive unit 40 is shown in FIGS. 6 to 8.

By the drive unit 40, the operation module 10 may be moved in the front direction F from the first position to the second position. Accordingly, when the operation module 10 is located in the second position, the button 11 protrudes from the panel surface, and the skin 30 is deformed into a shape in which the portion covering the button 11 protrudes (see FIGS. 4 and 5). Of course, if the second position is a position located rearward of the first position and the button 11 is recessed with respect to the panel surface, the skin 30 may be deformed into a shape in which the portion covering the button 11 is recessed when the operation module 10 is located in the second position.

Conversely, by the drive unit 40, the operation module 10 may be moved back to the first position from the second position. Accordingly, when the operation module 10 is located in the first position, the button 11 flushes with the panel surface, and the skin 30 is restored to provide a generally flat finished surface (see FIG. 1).

Figure 2:
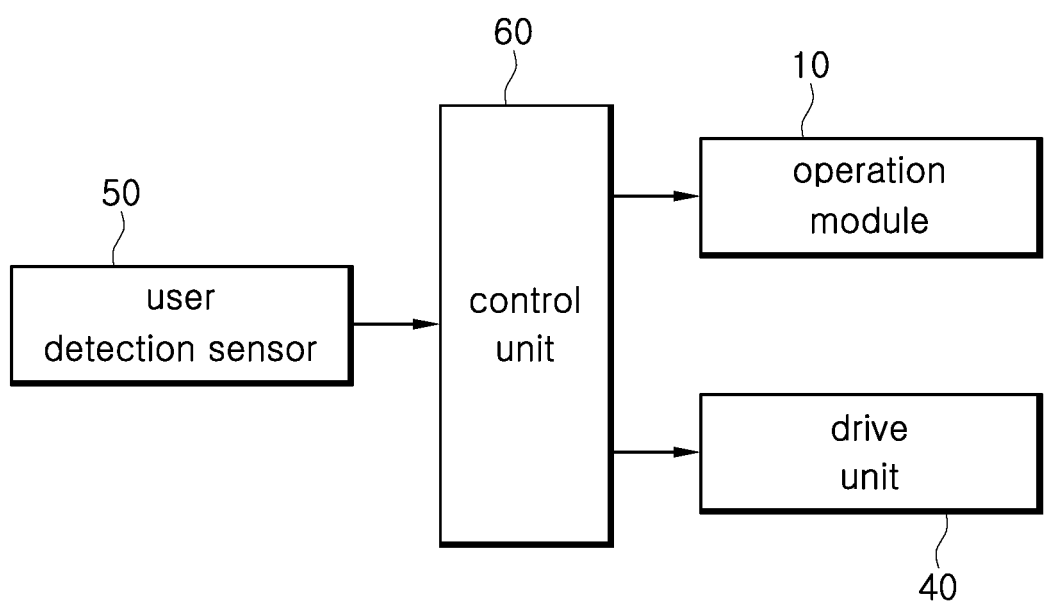

Referring to FIGS. 1 and 2, the operation apparatus further includes: a user detection sensor 50 for detecting a user's action for actuating the button 11; and a control unit 60 for controlling the operation module 10 and the drive unit 40 on the basis of a detection signal from the user detection sensor 50.

The user detection sensor 50 may be a proximity sensor that detects whether a user's body, such as a hand, is in proximity to the button 11. To be specific, the user detection sensor 50 may be an optical proximity sensor, a magnetic proximity sensor, an ultrasonic proximity sensor, a high frequency oscillation proximity sensor, a capacitive proximity sensor, or the like. For reference, among these sensors, the optical proximity sensor may include a light emitting element and a light receiving element receiving light from the light emitting element. The light emitting element may be a light emitting diode, and the light receiving element may be a phototransistor. For example, as shown in FIG. 1, the user detection sensor 50 may be provided around the opening 2 in the panel surface.

When a detection signal is input from the user detection sensor 50 while the operation module 10 is located in the first position, the control unit 60 determines that the user attempts to manipulate the button 11, and moves the operation module 10 from the first position to the second position by the control of the drive unit 40 (see FIGS. 4 and 5). When the button 11 is not manipulated for a preset time after the operation module 10 is located in the second position, the control unit 60 determines that the user does not want to manipulate the button 11, and moves the operation module 10 from the second position to the first position by the control of the drive unit 40 (see FIG. 1).

The operation module 10 is kept in an inactive state in the first position and is kept in an active state in the second position. To switch the state of the operation module 10, the control unit 60 may set the operation module 10 to an inactive state when the operation module 10 is in the first position, or to an active state when the operation module 10 is in the second position.

Thanks to the configuration that allows switching between active and inactive states with respect to the operation module 10, the user may manipulate the button 11 to operate a device to be operated when the operation module 10 is located in the second position, and while the operation module 10 is waiting in the first position, it is possible to prevent the button 11 from being accidentally actuated by the user, thereby avoiding an unintentional operation of a device associated to the button 11.

Figure 3:
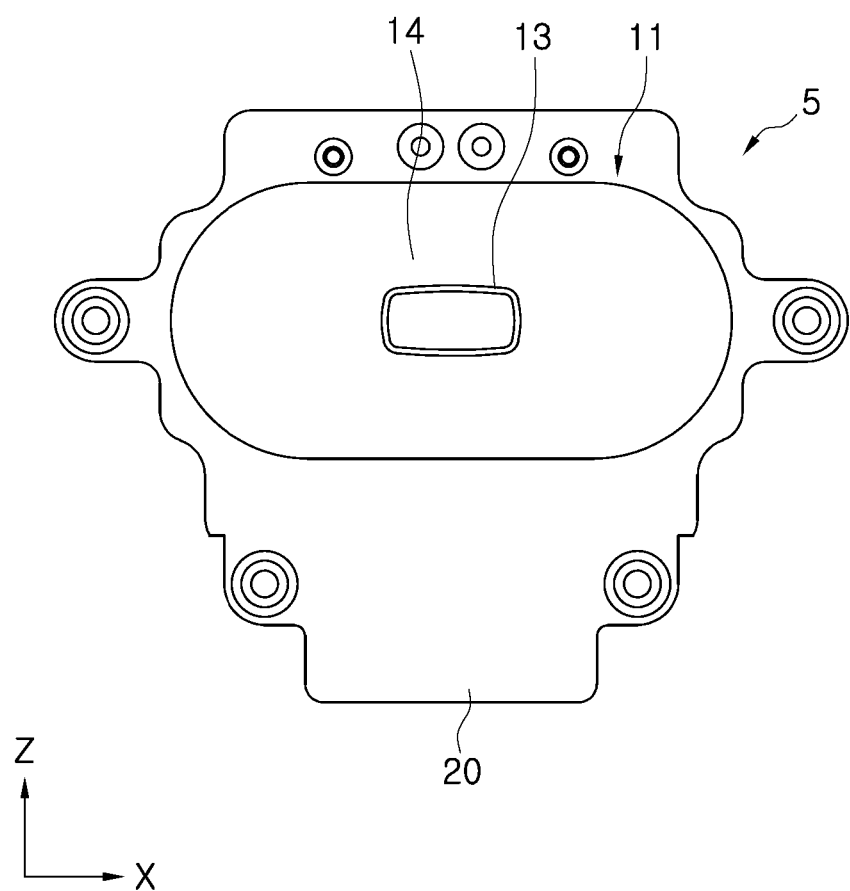
FIG. 3 is a front view illustrating an operation module assembly shown in FIG. 1.

As illustrated in FIGS. 4 and 5, the operation module 10 further includes a light source 12 for providing light. The light source 12 may be built into the button 11 to emit the light toward the surface of the button 11. The light source 12 may provide light of various colors. For example, the light source 12 may include at least one light emitting diode. As illustrated in FIG. 3, the button 11 is provided with a light-transmitting area 13 through which light from the light source 12 passes, and a light-blocking area 14 blocking the light from passing through. The light-transmitting area 13 may be formed to have the shape of characters and/or figures indicating the function of the button 11. In the operation module 10, the light source 12 is maintained in an off state in the first position, and the light source 12 is maintained in an on state in the second position. To change the state of the light source 12, the control unit 60 may turn off the light source 12 when the operation module 10 is located in the first position, and turn on the light source 12 when the operation module 10 is located in the second position. Thanks to the configuration that allows switching between off and on states with respect to the light source 12, when the operation module 10 is located in the second position, the active state of the operation module 10 and the position of the button 11 may be more accurately recognized by the user.

The skin 30 has a uniform light transmittance so that light from the light source 12 may pass through the skin 30. For example, the skin 30 may be a sheet having the uniform light transmittance woven with flexible fibers. In addition, although the user detection sensor 50 is provided around the opening 2 in the panel surface, the user's action for manipulating the button 11 may be detected by the user detection sensor 50.

As illustrated in FIGS. 4 and 5, the operation apparatus may be configured such that the button 11 may protrude (or recessed) to different heights from the panel surface. That is, the second position may consists of a rear region located comparatively close to the panel surface, which is achieved by moving the operation module 10 a first distance from the first position, and a front region located comparatively far from the panel surface, which is achieved by moving the operation module 10 a second distance from the first position. Therefore, the button 11 may protrude to a second height H2 when the operation module 10 is located in the front region, and may protrude to a first height H1 when the operation module 10 is located in the rear region. As another embodiment, if the button 11 is configured to recess with respect to the panel surface and the second position is located rearward of the first position, the button 11 may be recessed to different heights.

The operation apparatus may be configured such that, the operation module 10 may be moved the first distance from the first position according to the detection signal of the user detection sensor 50 to be located in the rear region of the second position. In this case, the button 11 may protrude to the first height H1 (see FIG. 4). The operation module 10 may be moved the second distance from the first position according to the detection signal of the user detection sensor 50 to be located in the front region of the second position. In this case, the button 11 may protrude to the second height H2 (see FIG. 5). In addition, depending on whether the operation module 10 is located in the rear region (the button 11 is protruded to the first height H1) or in the front region (the button 11 is protruded to the second height H2), the button 11 may be manipulated to perform a first function or a second function. For example, when the device to be operated is a sound device, a volume may be increased as a first operation corresponding to the first function, and a volume may be decreased as a second operation corresponding to the second function. As another example, when the button 11 is manipulated while the operation module 10 is located in the rear region, a first device (e.g., a lighting device) may be operated as the first function, and when the button 11 is manipulated while the operation module 10 is located in the front region, a second device that is different from the first device may be operated as the second function. With this configuration, since multiple functions may be performed with one button, the number of buttons required to be provided may be reduced.

To implement multiple functions with one button, the user detection sensor 50 may detect, on the basis of the user's action for manipulating the button 11, whether a user's hand or the like that is in the proximity of the button 11 is located in a first range or in a second range based on the button 11. For example, a region of the first range may be a range in which the user's hand or the like that is in the proximity of the button 11 is at a relatively close distance based on the button 11, and a region of the second range may be a range in which the user's hand or the like that is in the proximity of the button 11 is at a relatively long distance based on the button 11. As another example, the first range and the second range may be a left region (or an upper region) and a right region (or a lower region) based on the button 11 of the operation module 10 at the first position.

In this regard, when the user detection sensor 50 detects that the user's hand is positioned in the first range while the operation module 10 is located in the first position, the control unit 60 may determine that the user is attempting to manipulate the button 11 to perform the first function. Therefore the control unit 60 may move the operation module 10 to the rear region of the second position (see FIG. 4) by controlling the drive unit 40. On the other hand, when the user detection sensor 50 detects that the user's hand is positioned in the second range, the control unit 60 may determine that the user is attempting to manipulate the button 11 to perform the second function. Therefore, the control unit 60 may move the operation module 10 to the front region of the second position (see FIG. 5) by controlling the drive unit 40. In addition, by the control unit 60, the operation module 10 may be maintained in a state in which the light source 12 emits light of different colors depending on whether the operation module 10 is located in the front region of the second position or in the rear region of the second position. Because it is allowed that the light source 12 emits the light of a first color when the operation module 10 is located in the rear region, and emits the light of a second color when the operation module 10 is located in the front region, it is possible for the user to more accurately recognize whether the operation module 10 is located in the front region or in the rear region.

Several examples of the drive unit 40 applied to the operation apparatus are illustrated in FIGS. 6 to 8. FIGS. 6 to 8 show a state in which the operation module 10 is moved the second distance from the first position and is located in the front region of the second position.

FIG. 6 is a plan view illustrating an example of a drive unit. The drive unit 40A illustrated in FIG. 6 may include a rotation motor 101, a rack 102, and a pinion 103. The rack 102 may extend rearward along the Y-axis direction from the rear portion of the operation module 10. The pinion 103 may be rotated in both directions D1 (e.g. clockwise and anti-clockwise directions) by power from the rotation motor 101 in a state engaged with the rack 102. The position of the rotation motor 101 may be fixed to the base 21 or the base cover 22. When the pinion 103 is rotated by the rotation motor 101, the rack 102 is moved along the Y-axis direction, and the operation module 10 is also moved together with the rack 102 to move between the first position and the second position.

FIG. 7 is a side view illustrating another example of the drive unit. The drive unit 40B illustrated in FIG. 7 may include a linear actuator 111, a first tapered member 112, a second tapered member 113, and at least one elastic member 114. The first tapered member 112 and the second tapered member 113 may be disposed to be perpendicular to each other. The first tapered member 112 and the second tapered member 113 may be in contact with each other and have tapered surfaces corresponding to each other. The second tapered member 113 may extend rearwardly from the rear portion of the operation module 10 in the Y-axis direction, and may be provided at an extended end of the tapered surface. The elastic member 114 may be interposed between the operation module 10 and the base 21 in the accommodating space 23 to apply an elastic force to the operation module 10 in a backward movement direction. When the first tapered member 112 is moved in an upper direction D2 by the linear actuator 111 to pressurize the tapered surface of the second tapered member 113 with the tapered surface of the first tapered member 112, the operation module 10 may be moved forward (move from the first position to the second position) in the Y-axis direction, and the elastic member 114 may be compressed. When the first tapered member 112 is moved in the opposite direction, the operation module 10 may be moved rearward (move from the second position to the first position) in the Y-axis direction by the restoring force of the elastic member 114.

FIG. 8 is a side view illustrating still another example of the drive unit. The drive unit 40C illustrated in FIG. 8 may include a rotation motor 121, a rotation shaft 122, a cam member 123, at least one elastic member 124, and a contact block 125. The rotation shaft 122 may be provided in a direction, such as the X-axis direction or the Z-axis direction, orthogonal to the Y-axis direction at a position spaced rearward from the operation module 10, and may be rotated in both directions D3 by power from the rotating motor 121. The cam member 123 has a fixed end that is coupled to the rotation shaft 122 to be rotated together with the rotation shaft 122, and has a free end positioned opposite the fixed end that comes into contact with the contact block 125 provided at the rear portion of the operation module 10. The elastic member 124 may be interposed between the operation module 10 and the base 21 in the accommodating space 23 to apply an elastic force to the operation module 10 in a backward movement direction. A contact position of the free end of the cam member 123 with respect to the contact block 125 may be changed according to a rotation angle of the cam member 123. The operation module 10 may be pushed by the cam member 123 according to the rotation angle of the cam member 123 and moved forward (move from the first position to the second position) in the Y-axis direction, or may be moved rearward (move from the second position to the first position) in the Y-axis direction by the restoring force of the elastic member 124.

The effects of the present disclosure are not limited to those mentioned above, and other effects not mentioned will be clearly understood by those skilled in the art from this specification and accompanying drawings. In addition, although the present disclosure has been described above, the present disclosure is not limited by the disclosed embodiments and the accompanying drawings and may be variously modified by those skilled in the art without departing from the technical spirits of the present disclosure. In addition, the technical spirits described in the embodiments of the present disclosure may be implemented independently, or may be implemented in combination of two or more.

What is claimed is:

1. An operation apparatus for a vehicle, the operation apparatus comprising:
   a panel provided in the vehicle, wherein the panel has an opening;
   an operation module capable of moving, through the opening, forward and backward between a first position and a second position spaced apart from each other, and having a button disposed at a front end;
   a drive unit for moving the operation module;
   a sensor that detects a user's action for manipulating the button; and
   a control unit that controls the drive unit on the basis of a detection signal for the user's action from the sensor,
   wherein the operation module is moved a first distance and a second distance from the first position according to the detection signal, wherein the moving the operation module the first distance from the first position puts the operation module in a rear region of the second position and the moving the operation module the second distance from the first position puts the operation module in a front region of the second position, and
   the button is manipulated to perform different functions depending on whether the operation module is located in the front region or in the rear region,
   wherein the button is not actuated by a user when operation module is located in the first position, to avoid an unintentional operation of a device associated with the button.

2. The operation apparatus of claim 1, wherein the sensor detects whether a user's body is located in a first range or a second range with respect to the button on the basis of the user's action.

3. The operation apparatus of claim 2, wherein the operation module is moved the first distance when the sensor detects that the user's body is located in the first range, and
the operation module is moved the second distance when the sensor detects that the user's body is located in the second range.

4. The operation apparatus of claim 1, wherein the operation module includes a light source,
wherein the light source is controlled by the control unit to emit light of different colors depending on whether the operation module is located in the front region or in the rear region.

5. The operation apparatus of claim 4, wherein the light source is built into the button, and
the button has a light-transmitting area on a surface thereof for transmitting light from the light source.

6. The operation apparatus of claim 1, wherein the operation module is configured such that, in the first position, a surface of the button is flush with a surface of the panel.

7. The operation apparatus of claim 6, wherein the second position is located forward of the first position, and
the operation module is configured such that, in the second position, the button protrudes from the surface of the panel.

8. The operation apparatus of claim 1, further comprising:
a finish skin that provides a finished surface covering a surface of the panel to block the opening, has flexibility, and is configured such that a portion blocking the opening is moved together with the button so that a shape of the finished surface changes according to a movement of the operation module.

9. An operation apparatus for a vehicle, the operation apparatus comprising:
a panel constituting an interior part of the vehicle, wherein the panel has an opening;
an operation module capable of moving, through the opening, forward and backward between a first position and a second position spaced apart from each other, having a light source, and having a button disposed at a front end thereof;
a drive unit for moving the operation module;
a finish skin that provides a finished surface covering a surface of the panel to block the opening, has flexibility and light transmittance, and is configured such that a portion blocking the opening is moved together with the button so that a shape of the finished surface changes according to a movement of the operation module;
a sensor that detects a user's action for manipulating the button; and
a control unit that controls the operation module and the drive unit on the basis of a detection signal for the user's action from the sensor,
wherein the button is not actuated by a user when the operation module is located in the first position, to avoid an unintentional operation of a device associated with the button,
wherein the operation module is moved a first distance and a second distance from the first position according to the detection signal to be located either in a front region or a rear region of the second position,
wherein light of different colors is emitted from the light source and the button is manipulated to perform different functions depending on whether the operation module is located either in the front region or in the rear region.

* * * * *